United States Patent [19]

Fennhoff et al.

[11] Patent Number: 5,214,072
[45] Date of Patent: May 25, 1993

[54] PURIFICATION OF POLYCARBONATE, POLYESTER CARBONATE OR POLYESTER WASTE

[75] Inventors: Gerhard Fennhoff, Willich; Wolfgang Jakob, Moers; Manfred Ehlert, Dormagen, all of Fed. Rep. of Germany

[73] Assignee: Bayer Aktiengesellschaft, Leverkusen, Fed. Rep. of Germany

[21] Appl. No.: 958,206

[22] Filed: Oct. 8, 1992

[30] Foreign Application Priority Data

Oct. 15, 1991 [DE] Fed. Rep. of Germany ....... 4134019

[51] Int. Cl.$^5$ ............................................. C08J 11/04
[52] U.S. Cl. ........................................ 521/40; 521/48; 528/499; 528/502
[58] Field of Search .................... 521/40, 48; 528/499, 528/502

[56] References Cited

U.S. PATENT DOCUMENTS 5,151,452  9/1992  Fennhoff et al. ..................... 528/40

Primary Examiner—Harold D. Anderson
Attorney, Agent, or Firm—Joseph C. Gil; Aron Preis

[57] ABSTRACT

A process for the purification of waste of thermoplastic resins containing at least one member selected from among aromatic polycarbonates, aromatic polyester carbonates and aromatic polyesters and at least one of aluminum, lacquers and dyes which waste accumulates in the production of optical moldings is disclosed. The process which entails size reduction of the waste, chemical wash and filtering steps yields purified resins suitable for thermoplastic processing.

1 Claim, No Drawings

PURIFICATION OF POLYCARBONATE, POLYESTER CARBONATE OR POLYESTER WASTE

FIELD OF THE INVENTION

The invention concerns thermoplastic resins and in particular the rendering of waste resins suitable for reprocessing by a process of purification.

SUMMERY OF THE INVENTION

A process for the purification of waste of thermoplastic resins containing at least one member selected from among aromatic polycarbonates, aromatic polyester carbonates and aromatic polyesters and at least one of aluminum, lacquers and dyes which waste accumulates in the production of optical moldings is disclosed. The process which entails size reduction of the waste, chemical wash and filtering steps yields purified resins suitable for thermoplastic processing.

BACKGROUND OF THE INVENTION

Audio compact discs produced by injection molding from aromatic polycarbonates. The moldings thus produced are metallized with aluminum by vapor deposition and are then surface-sealed with crosslinking lacquers. In addition, they are printed with dyes. Finally, they are subjected to quality control where 10% to 15% of the compact discs are rejected because of defects.

In the same way as audio compact discs, lenses are surface-sealed with crosslinking lacquers or even with polysiloxanes. In their case, too, considerable quantities of polymer waste accumulate as a result of quality control.

Lamp and headlamp reflectors are aluminum-coated. Waste accumulates both in the production of these moldings and after their use.

Similar problems arise in the industrial application of aromatic polyester carbonates and aromatic polyesters.

On account of their metal content, the lacquers and the dyes, the waste in question cannot be reused for other high-quality moldings by directly re-extruding or blending with other polymers and/or polycondensates.

Accordingly, the problem addressed by the present invention was to work up plastic waste of the type in question by a simple, industrially workable process in such a way that the aromatic polycarbonates, the aromatic polyester carbonates and the aromatic polyesters could be reused.

DETAILED DESCRIPTION OF THE INVENTION

Accordingly, the present invention relates to a process for the purification of waste of thermoplastic aromatic polycarbonates and/or thermoplastic aromatic polyester carbonates and/or thermoplastic aromatic polyesters (herein polycondensate waste) containing aluminum and/or lacquers and/or dyes, characterized in that the polycondensate waste 1. is size-reduced to fragments with a mean diameter of 0.1 cm to 5 cm and preferably 0.5 cm to 1.5 cm,
2. the fragments obtained are then stirred with bases for 20 to 300 minutes and preferably for 90 to 180 minutes at temperatures of 10° C. to 100° C. and preferably at temperatures of 70° C. to 95° C.,
3. washed with dilute acids after removal of the bases and
4. subsequently washed with water until free from electrolytes,
5. the polycondensate fragments washed free from electrolytes are then washed with water while gently stirring so that all the lacquer components, aluminum or dye components which are separated from the polycondensate fragments, but not yet dissolved are rinsed out and
6. the purified fragments of polycondensate waste are filtered off and dried.

The polycondensate waste is preferably size-reduced to fragments in a shredder or in a mill (see, for example, "Ullmanns Encyklopadie der technischen Chemie", 4th Edition, 1972, Vol. 2, Verfahrenstechnik I (Grundoperationen), pages 2 to 34).

Bases in the context of the invention are, for example, dilute aqueous and/or dilute alcoholic solutions of alkali metal hydroxides and/or dilute aqueous and/or dilute alcoholic solutions of alkaline-earth metal hydroxides and/or dilute aqueous and/or dilute alcoholic solutions of ammonia and/or dilute aqueous and/or dilute alcoholic solutions of organic amines. Dilute aqueous solutions of alkali metal hydroxides are preferred, dilute aqueous solutions of sodium and/or potassium hydroxide being particularly preferred. The bases are used in concentrations of 0.01 to 2.5 mol per liter solvent and preferably in concentrations of 0.05 to 1.5 mol per liter solvent.

The quantity of base per kg polycondensate fragments is 0.05 to 2.5 mol base per kg polycondensate. Preferred ranges are from 0.5 mol to 1.5 mol per kg polycondensate waste.

In the context of the invention, dilute acids for removing residual base are mineral acids such as, for example, hydrohalic acids, the halogen being chlorine, bromine or iodine, perchloric acid, phosphoric acid or sulfuric acid, although dilute solutions of organic acids in water, such as for example formic acid, acetic acid and/or propionic acid, may also be used.

The concentration of the dilute acids is about 0.01 to 0.5 mol per liter solvent.

The quantity of acids is between 0.5 and 6 kg acid per 1000 kg of polycondensate waste.

Washing of the fragments and rinsing of the fragments in accordance with steps 4 and 5 of the process according to the invention is preferably carried out with distilled water at temperatures of 10° C. to 100° C. and preferably at temperatures of 20° C. to 35° C. The washing time and quantity of water may readily be determined by the expert in each individual case. Electrolyte-free in the context of the present invention means that the washing waters flowing off have a pH value of about 6 to 7. Filtration of the rinsed fragments in accordance with step 6 of the process according to the invention is carried out in known filter units.

The fragments of polycondensate waste are dried in conventional dryers (see, for example, "Ullmanns Encyklopadie der technischen Chemie", 4th Edition, 1972, Vol. 2, Verfahrenstechnik I (Grundoperationen), pages 699 to 721).

The polycarbonates, polyester carbonates and polyesters purified by the process according to the invention are free from troublesome impurities and may therefore be reprocessed in known manner to moldings or blended in known manner with other thermoplastics, for example with polyalkylene terephthalates, styrene/acrylonitrile polymers or ABS graft polymers, to form blends.

The subject of the process according to the invention and its outcome were by no means obvious because, on the one hand, the polycondensates in question are sensitive to bases and because it had not been expected that the large quantity of lacquers and dyes present in the polycondensate waste would be removed and substantially dissolved by treatment with bases in accordance with the invention.

Lacquers which can be separated from the polymer and partly dissolved by the process according to the invention are, for example, lacquers based on polyacrylonitrile, polyacrylate, polymethacrylate, polyvinyl chloride, melamine resin, epoxyisocyanate or polyurethane.

Dyes which can be separated by the purification process according to the invention are, for example, dyes based on naphthoquinones, benzoquinones, anthraquinones and azo compounds and also organic pigments and inorganic pigments, such as iron oxides, chromium oxides and titanium dioxide.

Thermoplastic aromatic polycarbonates in the context of the invention are polycarbonates which have been produced from diphenols and carbonate donors by any of the usual methods known from the literature (see, for example, H. Schnell "Chemistry and Physics of Polycarbonates", Interscience Publishers, New York, 1964; U.S. Pat. No. 3,028,365 and DE-OS 3,832,396 LeA 26 344).

Diphenols for polycarbonates such as these may be, for example, hydroquinones, resorcinols, dihydroxydiphenyls, bis-(hydroxyphenyl)-alkanes, bis(hydroxyphenyl)cycloalkanes, bis(hydroxyphenyl)sulfines, bis(-hydroxyphenyl)-ethers, bis(hydroxyphenyl)ketones,, bis(hydroxyphenyl)-sulfones, bis(hydroxyphenyl)-sulfoxides, $\alpha, \alpha'$-bis(hydroxyphenyl) diisopropyl benzenes, nucleus-alkylated and nucleus-halogenated compounds thereof.

Preferred diphenols are, for example, 4,4'-dihydroxy diphenyl, 2,2-bis-(4-hydroxyphenyl)propane, 2,4-bis-(4-hydroxyphenyl)-2-methyl butane, 1,1-bis(4-hydroxyphenyl) p-diisopropyl benzene, 2,2-bis-(3-methyl-4-hydroxyphenyl) propane, 2,2-Bis-(3-hydroxyphenyl)-methane, 2,2-bis(3,5-dimethyl-4-hydroxyphenyl)propane, bis-(3,5-dimethyl-4-hydroxyphenyl)sulfone, 1,1-Bis-(3,5-dimethyl-4-hydroxyphenyl)-p-diisopropyl benzene, 2,2-bis-(3,5-dibromo-4-hydroxylphenyl)propane and 1,1-bis-4-hydroxyphenyl)-3,3,5-trimethyl cyclohexane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-proprane, 2,2-bis-(3,5-dibromo-4-hydroxyphenyl)propane, 1,1-bis-(4-hydroxypheny)-cyclohexane and 1,1-bis-4-hydroxyphenyl)-3,3,5-trimethyl cyclohexane. Mixtures of the diphenols mentioned above may also be used.

The diphenols are either known from the literature or may be produced by known methods.

Aromatic polyester carbonates in the context of the invention are those which are synthesized from at least one aromatic bisphenol, at least aromatic dicarboxylic acid and carbonic acid. Suitable diphenols are those mentioned above. Suitable aromatic dicarboxylic acids are, for example, orthophthalic acid, terephthalic acid, isophthalic acid, tert. butyl isophthalic acid, 3,3'-diphenyl ether dicarboxylic acid, 4,4'-diphenyl dicarboxylic acid, 4,4'-diphenyl ether dicarboxylic acid, 4,4'-benzophenone dicarboxylic acid, 3,4'-benzophenone dicarboxylic acid, 4,4'-diphenyl sulfone dicarboxylic acid, 2 2-bis-(4-carboxyphenyl)-propane, trimethyl-3-phenylindane-4,5'-dicarboxylic acid.

Of the aromatic dicarboxylic acids, terephthalic acid and/or isophthalic acid are particularly preferred.

The aromatic polyester carbonates may be produced by methods known from the literature for the production of polyester carbonates, for example by processes in homogeneous solution, by melt transesterification processes and by the two-phase interfacial process.

Thermoplastic aromatic polyesters in the context of the invention are the reaction products of the bisphenols and dicarboxylic acids mentioned above. They have molecular weights Mw, as determined by measurement of the relative viscosity after calibration, in the range from 10,000 to 200,000 and preferably in the range from 16,000 to 80,000 and are produced by methods known from the literature.

Aromatic polycarbonates and aromatic polyester carbonates in the context of the invention are in particular those which also have weight average molecular weights in the range from 10,000 to 200,000 and preferably in the range from 16,000 to 80,000, as determined in known manner by gel permeation chromatography.

The polycondensate waste purified by the process according to the invention may be reprocessed in the same way as the original resins to produce any of a variety of moldings, including films for example, in standard machines such as extruders or injection molding machines.

The moldings obtained may then be used in known manner in the electrical field, for optical applications in the automotive industry or as lamp covers or roof coverings.

They may be provided before or during processing with the usual additives, stabilizers, mold release agents etc. typically used for polycarbonates, polyester carbonates and polyesters in the usual quantities.

The invention is further illustrated but is not intended to be limited by the following examples in which all parts and percentages are by weight unless otherwise specified.

EXAMPLES

A. The compact disc waste (polycarbonate metallized with aluminum and coated with lacquer) used for the following tests were first size-reduced to a particle size of 1 mm to 15 mm in a shredder. The shredded product thus obtained contained a total of 0.35% by weight lacquer (crosslinked polyacrylonitrile and crosslinked polyvinyl chloride) and aluminum.

The relative solution viscosity of the shredded polycarbonate after mechanical separation of lacquers and aluminum (0.5 g polycarbonate in 100 ml dichloromethane at 23° C.) was 1.196.

EXAMPLE 1

300 g of the shredded compact discs mentioned in A. are added with stirring to 450 g of a 5% sodium hydroxide solution which was then heated for 90 minutes to the boiling temperature so that all the aluminum and parts of the lacquer are dissolved and the remaining lacquer residues have separated from the polycarbonate and dissolved. After removal of the sodium hydroxide solution, the polycarbonate is washed with 10% acetic acid and then with softened water until neutral and the lacquer residues remaining are rinsed out. After filtration, the polycarbonate is dried at 120° C.

The relative solution viscosity of the resulting purified resin has not changed in relation to the value mentioned in A.

EXAMPLE 2

As Example 1, but with 5% potassium hydroxide solution instead of the 5% sodium hydroxide solution.

The relative solution viscosity of the resulting purified resin has not changed in relation to the value shown in A.

EXAMPLE 3

200 kg of a 5% sodium hydroxide solution are introduced into a 500 liter tank equipped with a stirrer and with a flanged-on filter and flotation outlet. The tank is evacuated and then purged with nitrogen. The gas exchange was repeated two more times and, finally, a nitrogen blanket of 15 m³ nitrogen per hour was established. 100 kg of the polycarbonate waste mentioned in A. are added to the tank with continuous stirring, heated to 90° C. with continuous stirring and kept at that temperature for 3 hours. After cooling to 30° C., the sodium hydroxide solution was drained off. The polycarbonate remaining in the tank is washed with 200 kg 0.5% acetic acid and then with softened water until neutral, the lacquer residues which have separated from the polycarbonate being rinsed out. Finally, the polycarbonate is dried at 120° C.

The relative solution viscosity of the resulting purified resin has not changed in relation to the value mentioned in A.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the purification of waste thermoplastic aromatic resin comprising in sequence the steps of
   (i) size-reducing said waste to obtain fragments having a mean diameter of 0.1 to 5 cm,
   (ii) stirring said fragments with a base for 20 to 300 minutes at temperatures of 10° to 100° C.,
   (iii) removing said base to obtain second fragments,
   (iv) washing said second fragments with a dilute acid to obtain acid-washed fragments,
   (v) washing said acid-washed fragments with water to obtain electrolyte-free fragments, (vi) washing said electrolyte-free fragments with water while gently stirring to effect separation of all contaminants to obtain pure fragments,
   (vii) rinsing said pure fragments with water and filtering to obtain rinsed-fragments,
   (viii) drying said rinsed fragments, said waste thermoplastic aromatic resin containing (a) at least one of polycarbonate, polyester or polyestercarbonate and (b) at least one contaminant selected from the group consisting of aluminum, lacquers, pigments and dyes.

* * * * *

REEXAMINATION CERTIFICATE (3299th)

United States Patent [19]
Fennhoff et al.

[11] B1 5,214,072
[45] Certificate Issued Aug. 12, 1997

[54] PURIFICATION OF POLYCARBONATE, POLYESTER CARBONATE OR POLYESTER WASTE

[75] Inventors: Gerhard Fennhoff, Willich; Wolfgang Jakob, Moers; Manfred Ehlert, Dormagen, all of Germany

[73] Assignee: Bayer Aktiengesellschaft, Leverkusen Bayerwerk, Germany

Reexamination Request:
No. 90/004,191, Mar. 22, 1996

Reexamination Certificate for:
Patent No.: 5,214,072
Issued: May 25, 1993
Appl. No.: 958,206
Filed: Oct. 8, 1992

[30] Foreign Application Priority Data

Oct. 15, 1991 [DE] Germany .................. 4134019

[51] Int. Cl.$^6$ .................................................. C08J 11/04
[52] U.S. Cl. ............... 521/48; 521/40; 521/40.5; 528/499; 528/502

[58] Field of Search ................... 521/48, 40, 40.5; 528/499, 502

[56] References Cited

U.S. PATENT DOCUMENTS

5,151,452  9/1992  Fennhoff et al. ................ 528/40

FOREIGN PATENT DOCUMENTS

3511711  2/1986  Germany .
89-3614  9/1989  Rep. of Korea .

*Primary Examiner*—Paul R. Michl

[57] ABSTRACT

A process for the purification of waste of thermoplastic resins containing at least one member selected from among aromatic polycarbonates, aromatic polyester carbonates and aromatic polyesters and at least one of aluminum, lacquers and dyes which waste accumulates in the production of optical moldings is disclosed. The process which entails size reduction of the waste, chemical wash and filtering steps yields purified resins suitable for thermoplastic processing.

B1 5,214,072

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

New claims 2–4 are added and determined to be patentable.

1. A process for the purification of waste thermoplastic aromatic resin [comprising] *consisting* in sequence the steps of
   (i) size-reducing said waste to obtain fragments having a mean diameter of 0.1 to 5 cm,
   (ii) stirring said fragments with a base for 20 to 300 minutes at temperatures of 10° to 100° C.,
   (iii) removing said base to obtain second fragments,
   (iv) washing said second fragments with a dilute acid to obtain acid-washed fragments,
   (v) washing said acid-washed fragments with water to obtain electrolyte-free fragments, (vi) washing said electrolyte-free fragments with water while gently stirring to effect separation of all contaminants to obtain pure fragments,
   (vii) rinsing said pure fragments with water and filtering to obtain rinsed-fragments,
   (viii) drying said rinsed fragments, said waste thermoplastic aromatic resin containing (a) at least [one of] polycarbonate[, polyester or polyestercarbonate] and (b) at least one contaminant selected from the group consisting of aluminum, lacquers, pigments and dyes.

*2. The process of claim 1 wherein said fragments have a mean diameter of 0.5 to 1.5 cm.*

*3. The process of claim 1 wherein stirring of said fragments with a base is for 90 to 180 minutes.*

*4. The process of claim 1 wherein said temperatures are 70° to 95° C.*

* * * * *